Aug. 2, 1960

A. W. HOLLAR, JR 2,947,023

DOOR HINGE, CHECK AND HOLD-OPEN

Filed May 26, 1958

INVENTOR.
Arthur W. Hollar, Jr.
BY
W. S. Pettigrew
ATTORNEY

Aug. 2, 1960  A. W. HOLLAR, JR  2,947,023
DOOR HINGE, CHECK AND HOLD-OPEN
Filed May 26, 1958  2 Sheets-Sheet 2

INVENTOR.
Arthur W. Hollar, Jr.
BY
W. S. Pettigrew
ATTORNEY ated Aug. 2, 1960

2,947,023

DOOR HINGE, CHECK, AND HOLD-OPEN

Arthur W. Hollar, Jr., Grosse Pointe, Mich., assignor to General Motors Corporation, Detroit, Mich., a corporation of Delaware Filed May 26, 1958, Ser. No. 737,919

3 Claims. (Cl. 16—145)

This invention relates to a door hinge, check and hold-open, and more particularly to an improved door hinge, check and hold-open for an automobile door.

One feature of the invention is that it provides an improved door hinge, check and hold-open; another feature of the invention is that it provides a hinge combination including first and second pivotally interconnected hinge members, the second of which has a free end adapted to abut an arm of the first hinge member to provide a positive door check when the door is in open position, together with spring means on said first hinge member adapted to engage the free end of the second hinge member to provide a yieldable hold-open; and still another feature of the invention is that the spring extends generally parallel to a portion of the first hinge member and has a free end lying in the path of movement of the free end of the second hinge member and abutting the second hinge member when the door is in open position.

Other features and advantages will be apparent from the following description and from the drawings, in which.

Figure 1:
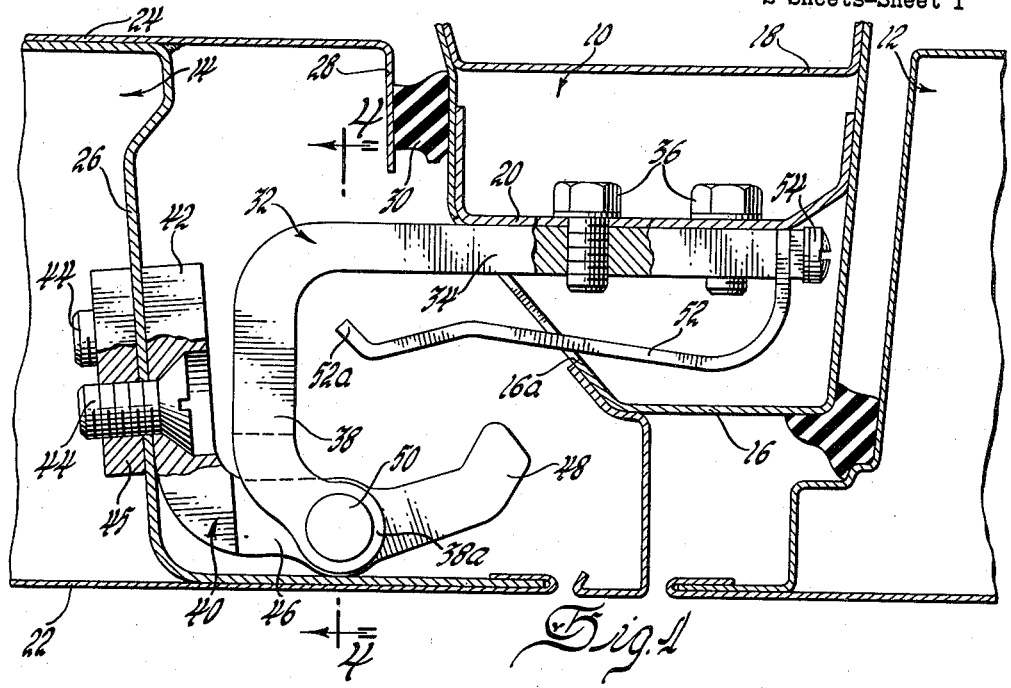
Fig. 1 is a fragmentary horizontal section through a portion of an automobile body and door showing the improved door hinge, check and hold-open device with the door in closed position.

This door hinge, check and hold-open is particularly adapted for use as a rear door hinge of an automobile, as shown for example in Figs. 1 and 6 of Patent 2,775,783 which issued on January 1, 1957 to W. F. Kapanka et al. Referring to the drawings, an automobile center pillar is shown at 10, the automobile front door is designated generally as 12, and the automobile rear door is designated generally as 14. The body pillar 10 is box-shaped in transverse section, being formed of a U-shaped channel member 16, the sides of which make up the front, rear, and outer walls of the body pillar, and a base member 18 which closes the open inner side of the pillar and is welded or secured by other known means to the opposite walls of the channel member 16. A reinforcing and mounting member 20 extends longitudinally across the body pillar, being secured to the front and rear walls thereof.

The rear door 14 is formed from an outer panel 22 and an inner panel 24 which are joined adjacent the rear edge of the door by a jamb panel 26. At its outer edge the jamb panel is secured to the edge of the outer panel 22 by a pinch weld flange and at its inner edge the jamb panel 26 is welded to the inner door panel 24. The inner door panel 24 has an extension terminating in a turned flange 28 which carries a weather strip 30 for sealing against the door pillar 10.

Figure 3:
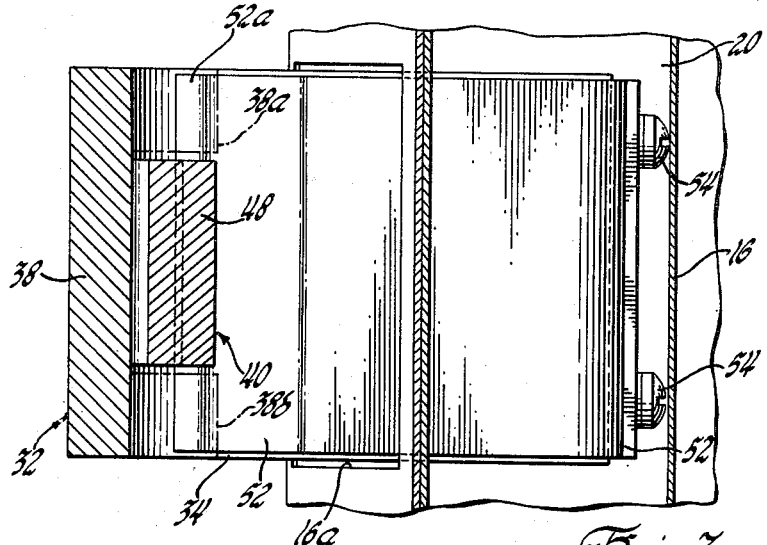
Fig. 3 is a vertical longitudinal section taken along the line 3—3 of Fig. 2.
Figure 4:
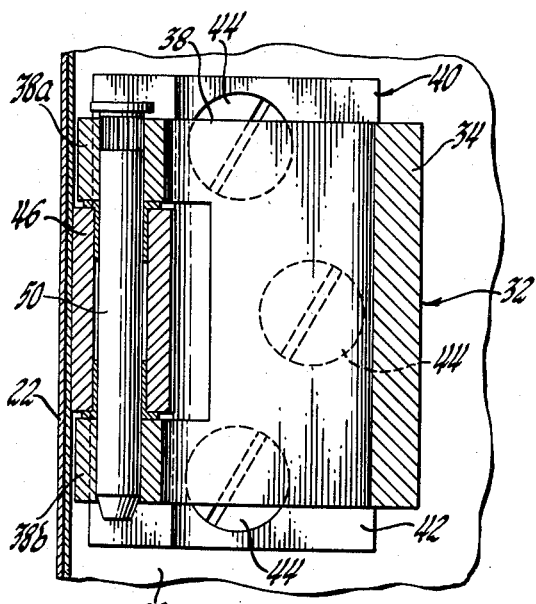
Fig. 4 is a transverse vertical section taken along the line 4—4 of Fig. 1.

A first hinge strap designated generally as 32 is of L-shaped configuration, having a stem portion 34 which extends through an opening 16a formed in the rear wall of the body pillar 10 and which is secured by bolts 36 to the support bracket 20 inside the body pillar. A leg portion 38 is bent outwardly at a right angle from the stem portion of the hinge strap 32 and terminates in a bifurcated end as shown best in Figs. 3 and 4 where the bifurcated end portions are designated at 38a and 38b.

A second hinge strap designated generally as 40 is also of L-shaped configuration, having a stem portion 42 secured by screws 44 to a mounting block 45 on the jamb panel 26 of the door and having a leg portion 46 which extends through the bifurcated end of the first hinge strap and terminates in a free end 48. A hinge pin 50 pivotally connects the bifurcated end of the first hinge strap 32 to the second hinge strap 40 intermediate the ends of the leg portion 46 of the second strap.

Figure 2:
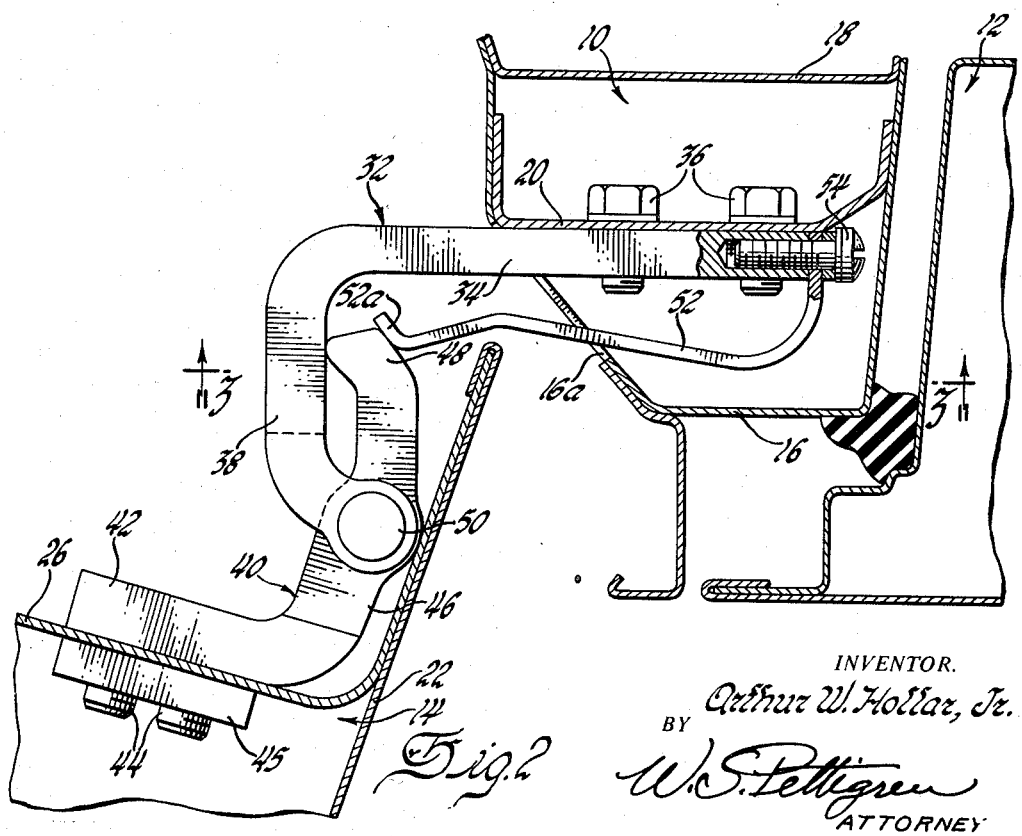
Fig. 2 is a similar view but with the door in open position.

A leaf spring 52 is mounted on the stem portion 34 of the first hinge strap 32 at a location adjacent the mounting of said first hinge strap on the body pillar 10. The spring extends generally parallel to the stem portion 34 of the first hinge strap 32 and terminates in spaced relation to the leg portion 38 of said first hinge strap. As shown in Figs. 1 and 2, the spring 52 is secured at one end by a bolt 54 to the end of the stem portion 34 of the first hinge strap, and the body portion of the spring extends out of the pillar 10 through the opening 16a, lying generally parallel to the stem portion 34 of the first hinge strap 32 and terminating in a bent end 52a which lies in spaced relation to the leg 38. Preferably, the space between the end 52a of the spring and the leg 38 is slightly less than the thickness of the end portion 48 of the second hinge strap.

Fig. 1 shows the relationship of the parts when the rear door 14 is closed. Here the free end 48 of the second hinge strap is out of contact with the spring and the second hinge strap to provide for unimpeded swinging movement of the door 14. When the door is opened, as shown in Fig. 2, the second hinge strap 40 swings about the axis of the hinge pin 50 until one side of the free end 48 abuts the leg portion 38 of the first hinge strap 32 to provide a positive door check or stop. The free end 52a of the spring 52 lies in the path of movement of the swinging end 48 of the hinge strap 40, the end of the hinge strap riding over the spring as the door opens so that end 52a of the spring abuts the opposite side of the end 48 of the hinge strap 40 when the door 14 is in open position to provide a yieldable hold-open. When the door is closed, the end 48 of the hinge strap cams over the spring, flexing the spring out of the way to permit closing the door.

While I have shown and described one embodiment of my invention, it is capable of many modifications. Changes, therefore, in the construction and arrangement may be made without departing from the spirit and scope of the invention as set forth in the appended claims.

What is claimed is:

1. A door hinge, check and hold-open for mounting a closure member on a vehicle body member for swinging movement between open and closed positions, comprising, a first L-shaped hinge strap having a stem portion fixedly mounted on said body member and a leg portion extending at an angle from said stem portion to form a bight; a second hinge strap having a stem portion fixedly mounted on said closure member and a leg portion extending at an angle from said stem portion; a hinge pin pivotally connecting the free end of the leg portion of the first hinge strap to the second hinge strap intermediate the ends of the leg portion of the second hinge strap, the free end portion of the leg of the second hinge strap extending into the bight of the L-shaped first hinge strap, one side of said free end being adapted to abut the leg portion of the first hinge strap when the closure is in open position to provide a positive check; and a leaf spring mounted on the stem portion of said first hinge strap at a location adjacent the mounting of said first hinge strap on said body member, said spring extending into the bight of the L-shaped first hinge strap and said spring having a free end lying in the bight of said first hinge strap and in the path of movement of the free end of the leg portion of said second hinge strap and abutting the opposite side of the leg portion of said second hinge strap when the closure is in open position to provide a yieldable hold-open.

2. Apparatus of the character claimed in claim 1, wherein the stem portion of the second hinge strap extends generally parallel to the leg portion of the first hinge strap when the closure is in closed position, and wherein the leg portion of the second hinge strap extends generally parallel to the leg portion of the first hinge strap when the closure is in open position.

3. Apparatus of the character claimed in claim 1, wherein the free end of said spring is spaced from the leg portion of said first hinge strap a distance slightly less than the thickness of the free end portion of the leg of the second hinge strap.

References Cited in the file of this patent

UNITED STATES PATENTS

| | | |
|---|---|---|
| 2,133,663 | Johnson et al. | Oct. 18, 1938 |
| 2,513,751 | Semar | July 4, 1950 |
| 2,799,042 | Hollansworth | July 16, 1957 |